(12) United States Patent
Thomas

(10) Patent No.: US 11,374,978 B2
(45) Date of Patent: Jun. 28, 2022

(54) METHODS AND SYSTEMS FOR ESTABLISHMENT OF SECURITY POLICY BETWEEN SDN APPLICATION AND SDN CONTROLLER

(71) Applicant: LGS Innovations LLC, Herndon, VA (US)

(72) Inventor: Tavaris Jason Thomas, New Providence, NJ (US)

(*) Notice: Subject to any disclaimer, the term of this patent is extended or adjusted under 35 U.S.C. 154(b) by 838 days.

(21) Appl. No.: 16/172,999

(22) Filed: Oct. 29, 2018

(65) Prior Publication Data
US 2020/0137113 A1 Apr. 30, 2020

(51) Int. Cl.
| *H04L 9/40* | (2022.01) |
| *H04L 45/00* | (2022.01) |
| *H04L 41/0893* | (2022.01) |
| *H04L 45/64* | (2022.01) |
| *H04L 41/12* | (2022.01) |

(52) U.S. Cl.
CPC .......... *H04L 63/20* (2013.01); *H04L 41/0893* (2013.01); *H04L 41/12* (2013.01); *H04L 45/38* (2013.01); *H04L 45/64* (2013.01); *H04L 63/101* (2013.01); *H04L 63/1425* (2013.01)

(58) Field of Classification Search
CPC .... H04L 63/20; H04L 63/101; H04L 63/1425
USPC .......................................................... 726/1
See application file for complete search history.

(56) References Cited

U.S. PATENT DOCUMENTS

| 9,038,151 B1* | 5/2015 | Chua ....................... H04L 45/28 |
| | | 726/6 |
| 2004/0095947 A1* | 5/2004 | Luciani ............... H04L 12/4608 |
| | | 370/410 |
| 2014/0325649 A1* | 10/2014 | Zhang ................. H04L 63/1425 |
| | | 726/23 |
| 2014/0334492 A1* | 11/2014 | Mack-Crane .......... H04L 69/22 |
| | | 370/392 |
| 2015/0043382 A1* | 2/2015 | Arora ..................... H04L 41/20 |
| | | 370/254 |
| 2015/0234725 A1* | 8/2015 | Gillis ................... G06F 11/263 |
| | | 714/33 |
| 2016/0157124 A1* | 6/2016 | Wilkinson ............ H04W 16/18 |
| | | 370/254 |
| 2016/0285704 A1* | 9/2016 | Gasparakis ........... H04L 41/142 |
| 2017/0093924 A1* | 3/2017 | Loo ................... H04L 29/06986 |

OTHER PUBLICATIONS

Huertas Celdran, Alberto et al. "Policy-Based Management for Green Mobile Networks Through Software-Defined Networking." Mobile networks and applications 24.2 (2016): 657-666. (Year: 2016).*

* cited by examiner

Primary Examiner — Thanhnga B Truong
Assistant Examiner — Angela R Holmes
(74) Attorney, Agent, or Firm — BakerHostetler; Tayan B. Patel

(57) ABSTRACT

The present application is directed a computer-implemented methods and systems implementing control policies created or modified by Software Defined Network applications. The control policies can be provided to SDN controllers for implementation.

16 Claims, 9 Drawing Sheets

METHODS AND SYSTEMS FOR ESTABLISHMENT OF SECURITY POLICY BETWEEN SDN APPLICATION AND SDN CONTROLLER

BACKGROUND

1. Field

This application is directed to systems and methods for enhancing security in software defined networking (SDN) environments. In particular, the application is directed to systems and methods for enforcing security policies or rules developed by a SDN application.

2. Related Art

Software Defined Networking or SDN environments allow network architects and developers to implement to use commodity hardware to duplicate or enhance functions of special-purpose hardware providing network control and other capabilities. One element in SDN environments is the SDN controller, which manages SDN functions and can configure elements (software, hardware, or combinations thereof) within SDN-enabled networks. Such elements can include hardware or software implementing, e.g., switches, firewalls, routers, and other appliances. In this manner SDN controllers handle local and remote interactions, connect disparate datacenters, and can be used to implement and manage cloud environments.

SDN applications can be elements within the SDN environment performing one or more functions within the network. By performing these functions, SDN applications have access to information about the traffic with which they interact. Traffic in the SDN environment is routed or handled by the SDN applications (and/or other network elements) according to various rules or policies.

Given the possible volume and complexity of network traffic, development of rules or policies for handling particular traffic types is difficult. Errors or vulnerabilities can arise if traffic is handled improperly. SDN applications observe information about types of traffic with which those applications interact, but to date there is no mechanism for allowing SDN applications to define techniques for handling traffic for implementation throughout the SDN environment. Further, even if techniques for deploying SDN application-developed policies or rules were identified, security of the SDN network remains a paramount concern to prevent unauthorized SDN applications or elements from promulgating such policies or rules.

It is thus desirable to develop techniques for securely establishing policies between SDN applications and SDN controllers.

SUMMARY

The foregoing needs are met, to a great extent, by the application directed to policy development by SDN applications.

One aspect of the application is directed to a computer-implemented method for network traffic control by a Software Defined Networking (SDN) application. The method includes generating, using the SDN application, a control policy for a network traffic event, converting the control policy to a table configured for use by a SDN controller, and providing, from the SDN application, the table to the SDN controller. A control rule based on the table is enforced by a network element in communication with the SDN controller.

Another aspect of the application is directed to a computer-implemented system for network traffic control by a Software Defined Networking (SDN) application. The system comprises a non-transitory memory having instructions stored thereon for implementing elements for network traffic control by the SDN application and a processor operatively coupled to the memory and configured to execute the instructions. Execution of the instructions effectuates a policy generation module of the SDN application configured to generate a control policy for a network traffic event, a policy conversion module of the SDN application configured to convert the control policy to table configured for use by a SDN controller, and a controller communication module of the SDN application configured to provide the table to the SDN controller. A control rule based on the table is enforced by a network element in communication with the SDN controller.

Yet another aspect of the application is directed to a method comprising receiving, at a Software Defined Networking (SDN) application, a request from user equipment to establish a virtual private network (VPN), transmitting, using the SDN application, the request to a VPN provider, obtaining, at the SDN application and from the VPN provider, VPN server credentials for a VPN, generating, using the SDN application, a security policy related to network traffic associated with the VPN, converting, using the SDN application, the security policy to a table, and transmitting, using the SDN application, the table to a SDN controller. A security rule based on the table is enforced by a network element in communication with the SDN controller.

There has thus been outlined, rather broadly, certain embodiments in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1A:
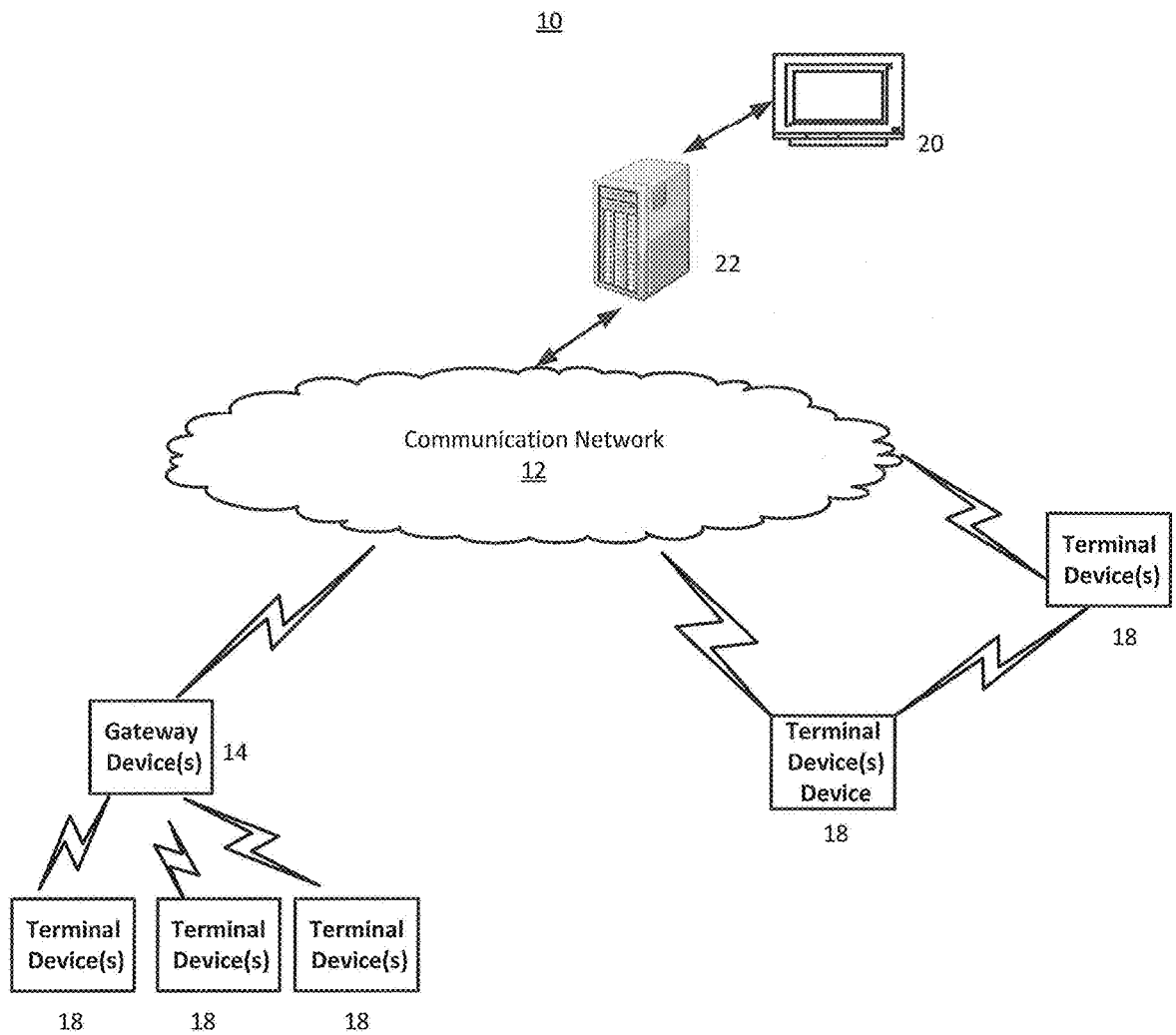
FIG. 1A illustrates a communication system according to an embodiment of the application.

SDN applications may have access to data about traffic with which they interact. Further, SDN applications (or other network elements) may be able to aggregate or access data about a plurality of SDN applications or network elements. This traffic information may inform policy generation within the network. Accordingly, improved traffic handling may be achieved by enabling SDN applications to securely establish policies that are implemented throughout the SDN environment. While security policies are frequently discussed herein, other policies or rules can be utilized without departing from the scope or spirit of the innovation.

Allowing SDN applications to define policies or rules, which can be communicated according to tables or flows, is a distinct technological improvement over current technologies. Policies implemented today are either local to a network element, or must be centrally generated at a SDN controller. This limits the situational awareness and flexibility of policies, and ultimately limits the capabilities of SDN applications to improve network function or security. SDN applications can use the data with which they interact or function as network sensors to increase performance, efficiency, and security in view of their behavior (and the behavior of nodes with which they interact or which they can observe) on the network. Allowing SDN applications to define policies or rules improves the technology of SDN environments. Embodiments combine groups of network elements (SDN applications, SDN controllers, hybrid network elements, et cetera) in an orderly manner to provide previously unachievable capabilities.

It is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," "embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

As used herein, a "hybrid" network element or "hybrid" device is a device which provides to both traditional network and Software Defined Network capabilities (e.g., a router configured to operate with non-SDN and SDN environments). In embodiments, a hybrid network element can utilize its own proprietary or non-SDN standard protocols and procedures as well as OpenFlow software. The hybrid network element can include a transmission control protocol (TCP) connection to a SDN controller and be configured for SDN operation. Hybrid network elements or devices can be virtualized instances of network elements or devices, or can be network- or device-specific hardware configured to support SDN management in addition to its purpose-built functionality.

General Architecture

FIG. 1A is a diagram of an example communication system 10 in which one or more disclosed embodiments may be implemented. As shown in FIG. 1A, the communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example. An enterprise network will be used in this application to include a satellite network, corporate network and/or home network.

The communication system 10 may include the Infrastructure Domain and the Field Domain. The Field Domain includes gateway device(s) 14, which in various examples might include elements such as a Service Capability Server (SCS) with a proxy and/or terminal devices 18 (e.g., user equipment devices). It will be appreciated that any number of gateway devices 14 and terminal devices 18 may be included in the communication system 10 as desired. Each of the gateway devices 14 and terminal devices 18 are configured to transmit and receive signals via the communication network 12 or direct radio link. The gateway device 14 allows wireless devices, e.g., cellular and non-cellular as well as fixed network devices, e.g., PLC, to communicate either through operator networks, such as the communication network 12 or direct radio link. For example, the devices 18 may collect data and send data, via the communication network 12 or direct radio link, to an application 20 or devices 18. The devices 18 may also receive data from the application 20 or a device 18. Further, data and signals may be sent to, and received from, the application 20 via a service layer 22, as described below. Devices 18 and gateways 14 may communicate via various networks including, cellular, WLAN, WPAN, e.g., Zigbee, 6LoWPAN, Bluetooth, direct radio link, and wireline for example.

Figure 1B:
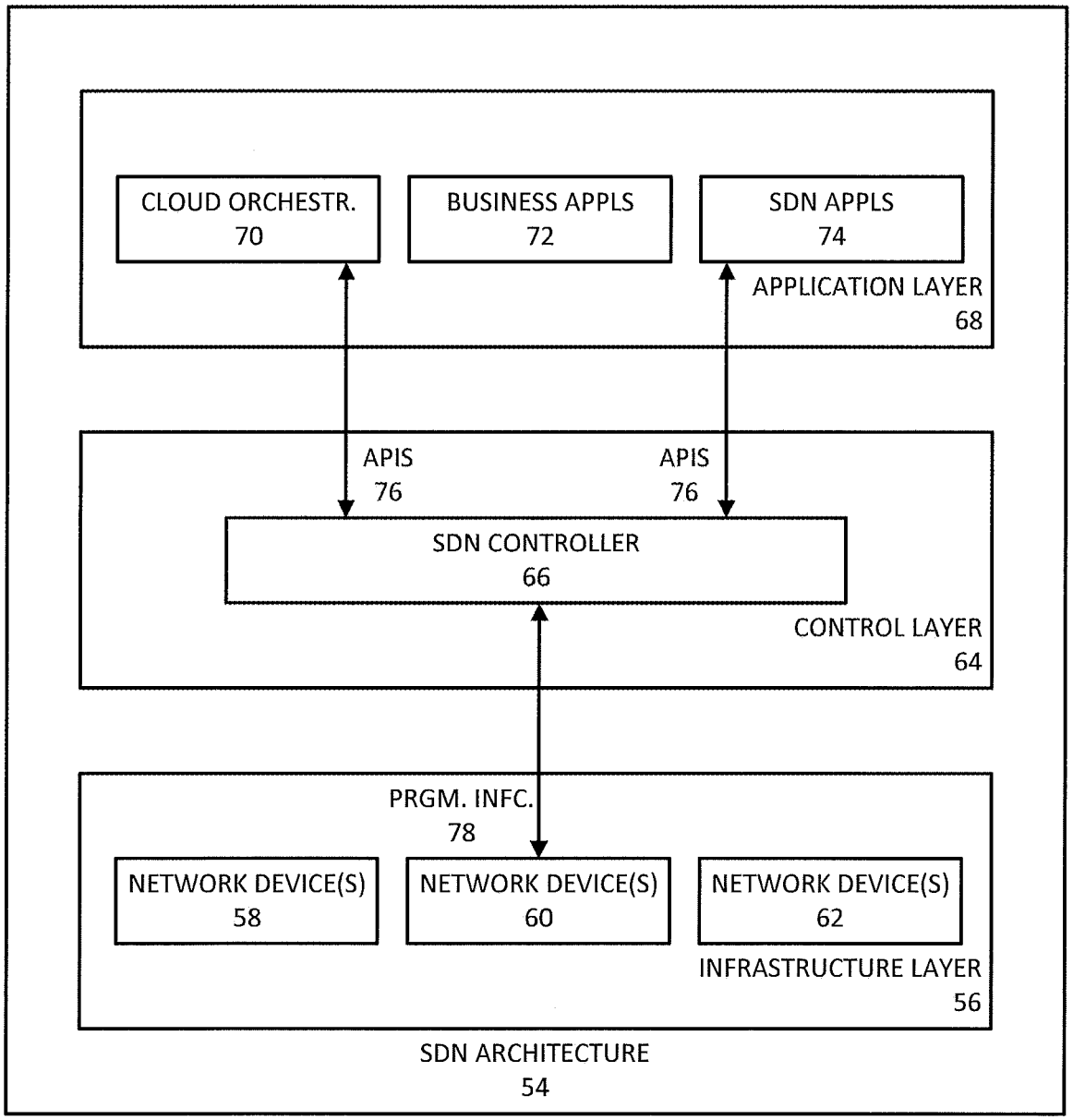
FIG. 1B illustrates a SDN environment according to an embodiment of the application.

Referring to FIG. 1B, a SDN architecture 54 is illustrated. The SDN architecture 54 can be implemented in communication network 12 and includes an infrastructure layer 56, a control layer 64, and an application layer 68. The infrastructure layer 56 includes network devices, which interact with the control layer 64 by way of a programmable interface(s) 78. The programmable interface 78 can be a control and data plane programmable interface. In embodiments, the programmable interface 78 is OpenFlow. Via the programmable interface 78, the SDN controller 66 can instruct network elements (e.g., hardware- or software-implemented routers, switches, et cetera) regarding how to move packets (i.e., network traffic) based on application requests, obviating the need for control intelligence distributed in the network elements along a given data path for those packets. The programmable interface(s) 78 may be referred to as "southbound" APIs. The programmable interface 78 can add or delete flow table entries or policies in network elements with which it interacts.

The control layer 64 includes the SDN controller 66. The control layer 64 communicates with the application layer 68 by way of APIs 76. The APIs 76 can be programmable open APIs, and may be referred to as "northbound" APIs.

The application layer 68 includes cloud orchestration elements 70, business applications 72, and SDN applications 74. The cloud orchestration elements 70 can be OpenStack or CloudStack elements, which can provide or manage compute, storage, and networking resources. The business applications 72 can be the functions provided to users of the network, as opposed to the SDN applications 74 providing functions for implementing and managing the network itself.

Figure 1C:
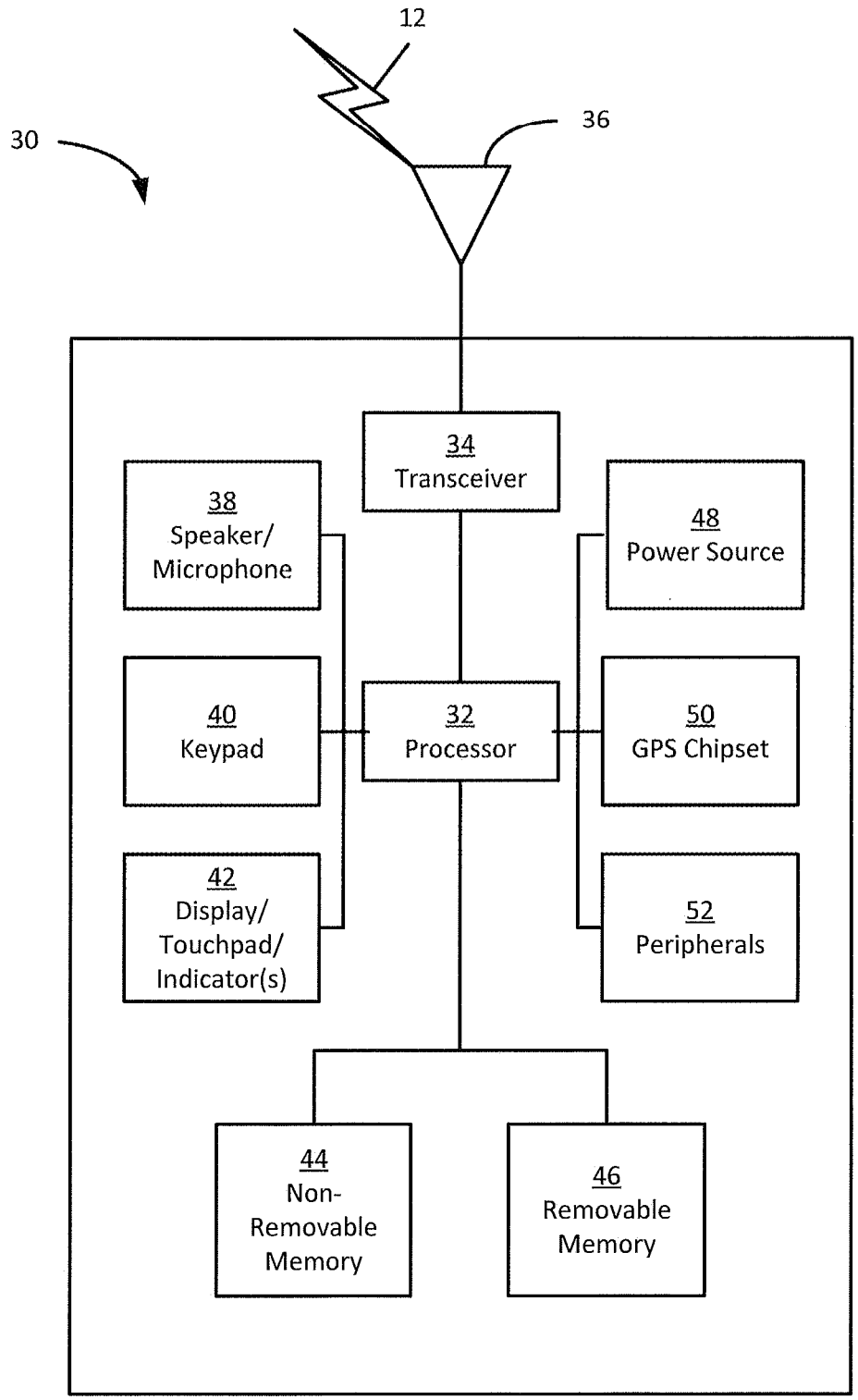
FIG. 1C illustrates a system diagram of an example device according to an embodiment of the application.

Whether commodity or special-purpose, the communication network 12, SDN architecture 54, et cetera, are supported by physical hardware devices. Further, elements within FIGS. 1A and 1B (e.g., terminal device 18, gateway device 14) may themselves include physical hardware. As such, FIG. 1C is a system diagram of an example device 30. As shown in FIG. 10, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display may further include a graphical user interface. It will be appreciated that the device 30 may include any sub-combination of the foregoing elements while remaining consistent with an embodiment. The device 30 may also be employed with other devices, including for example originators and hosting/transit CSEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, various network elements or services. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the device 30 may include any number of transmit/receive elements 36. More specifically, the device 30 may employ MIMO technology. Thus, in an embodiment, the device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 32 may receive power from the power source 48, and may be configured to distribute and/or control the power to the other components in the device 30. The power source 48 may be any suitable device for powering the device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
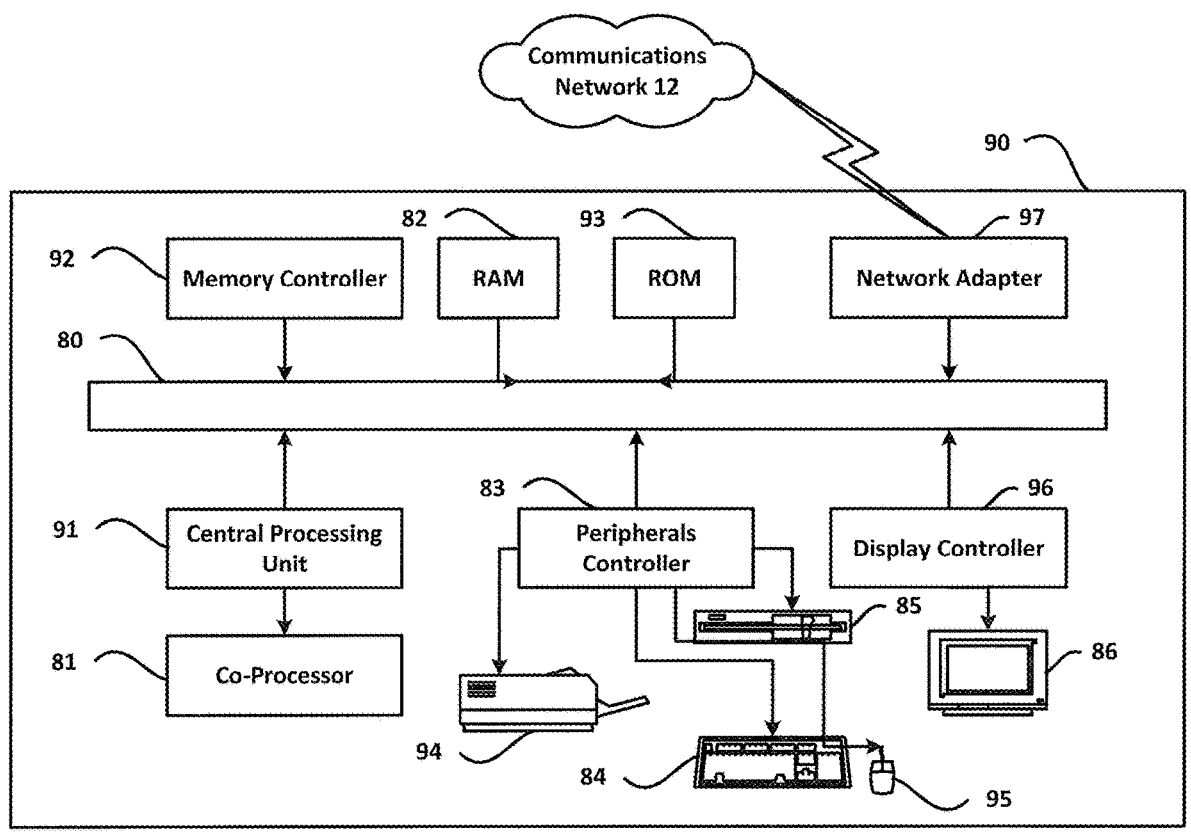
FIG. 1D illustrates a block diagram of an example computing system according to an embodiment of the application.

FIG. 1D is a block diagram of an example computing system 90 on which, for example, the SDN architecture 54 of FIG. 1B may be implemented. As will be described in more detail below, the computing system 90 may be, for example, a provider (e.g., server) or consumer (e.g., client) of resources (or both) depending on its arrangement in the systems, methods, and/or architectures described herein.

Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may also include a graphical user interface (GUI) for displaying or facilitating editing of aspects described herein. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as communication network 12 of FIG. 1A and FIG. 1B.

Cloud Computing

Cloud computing is interoperable with and provides resources for SDN environments. Generally, cloud computing resources are delivered as a service over a network connection including but not limited to the Internet. Cloud computing is therefore a type of computing that relies on sharing a pool of physical and/or virtual resources, rather than deploying local or personal hardware and software. One of the key characteristics of cloud computing is the flexibility that it offers and one of the ways that flexibility is offered is through scalability. This refers to the ability of a system to adapt and scale to changes in workload. Cloud technology allows for the automatic provision and de-provision of resource as and when it is necessary, thus ensuring that the level of resource available is as closely matched to current demand as possible. That is, the end user usually pays only for the resource they use and so avoids the inefficiencies and expense of any unused capacity.

Infrastructure as a Service (IaaS) is one of the three fundamental service models of cloud computing alongside Platform as a Service (PaaS) and Software as a Service (SaaS). Specifically, IaaS is specifically that of virtualized hardware, e.g., computing infrastructure. The definition includes such offerings as virtual server space, network connections, bandwidth, internet protocol (IP) addresses and load balancers. Physically, the pool of hardware resource is pulled from a multitude of servers and networks usually distributed across numerous data centers, all of which the cloud provider is responsible for maintaining. The client, on the other hand, is given access to the virtualized components in order to build their own IT platforms.

Private Cloud

A private cloud is a particular model of cloud computing that involves a distinct and secure cloud based environment in which only the specified client can operate. As with other cloud models, private clouds will provide computing power as a service within a virtualized environment using an underlying pool of physical computing resource. Here, the pool of resources is only accessible by a single organization providing that organization with greater control and privacy.

Traits that characterize private clouds include the ring fencing of a cloud for the sole use of one organization and higher levels of network security. By contrast, a public cloud has multiple clients accessing virtualized services which all draw their resource from the same pool of servers across public networks. Private cloud services draw their resource from a distinct pool of physical computers but these may be hosted internally or externally and may be accessed across private leased lines or secure encrypted connections via public networks.

The added security offered by the ring fenced cloud model is ideal for any organization, such as for example an enterprise, that needs to store and process private data or carry out sensitive tasks. For example, a private cloud service could be utilized by a financial company that is required by regulation to store sensitive data internally and who will still want to benefit from some of the advantages of cloud computing within their business infrastructure, such as on demand resource allocation.

Virtual Private Networks

Virtual Private Networks (VPNs) ensure privacy and data security. VPNs are private networks that extend across a public network or the internet. One of the main roles of a VPN is to create an encrypted connection (e.g., tunnel) over a less secure network. As a result, users can securely send and receive information across different networks as if their computing devices were directly connected to the same private network. In addition to conventional VPNs, the Applicant of this disclosure has developed dynamic VPNs for added security.

Use Cases

Figure 2A:
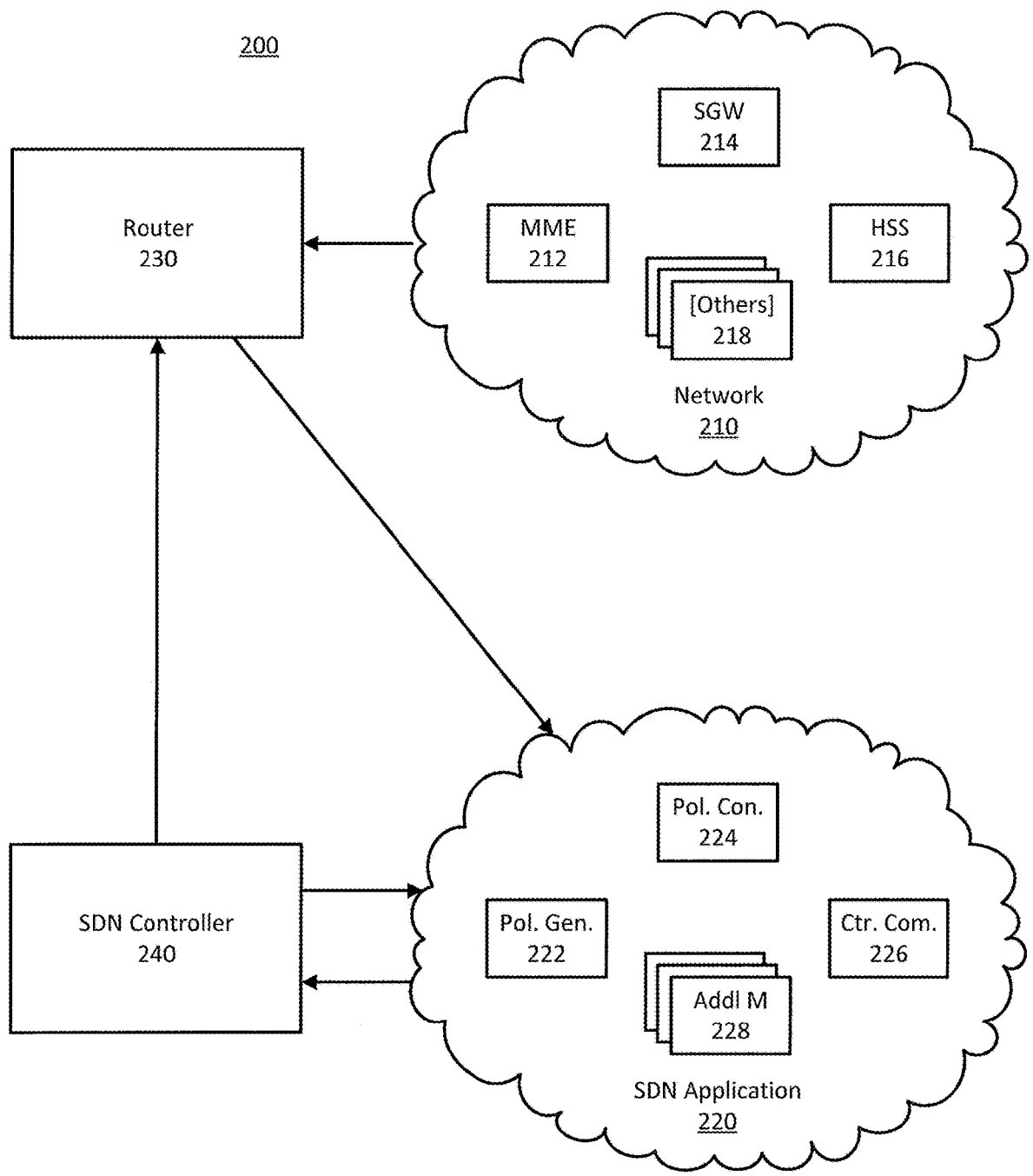
FIG. 2A illustrates an example system of the application.
Figure 2B:
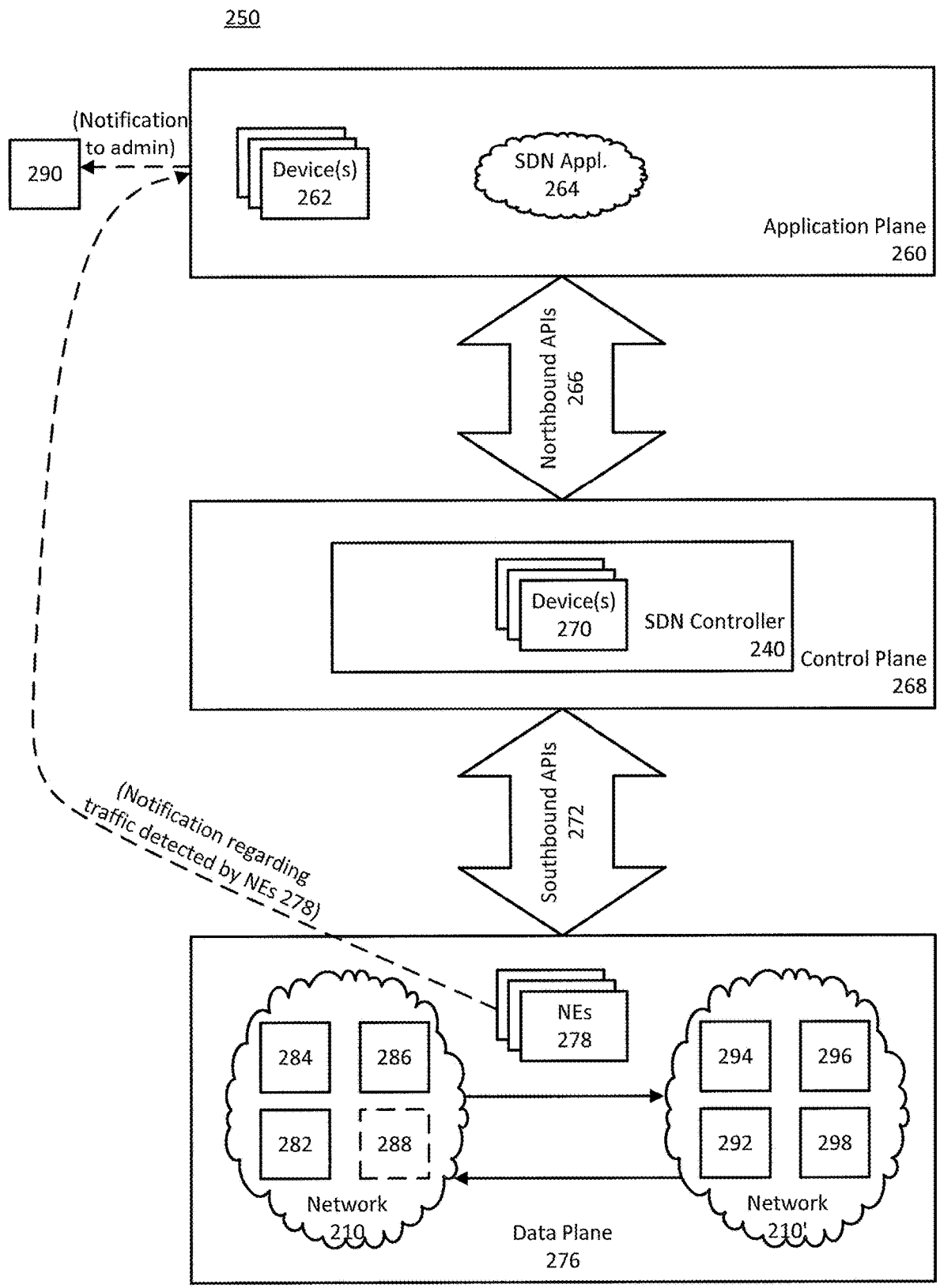
FIG. 2B illustrates an alternative illustration of an example system according to embodiments of the application.

FIGS. 2A and 2B illustrate example use cases in which a SDN application creates and promulgates policies to network elements. In embodiments, the policies can be security policies, but others can be developed and implemented without departing from the scope or spirit of the innovation.

FIG. 2A illustrates a system 200 including network 210 which communicates with and using network elements. Network 210 may be, e.g., a 3GPP network including a mobility management entity (MME) 212, a serving gateway (SGW) 214, a home subscriber server (HSS) 216, and various other network elements 218. Disparate network elements communicate with remote nodes, including the SDN application 220 and the SDN controller 240, through router 230. In embodiments, the router 230 can be configured in a promiscuous mode to listen for any stream control transmission protocol (SCTP) initiation (INIT) packets or chunks.

The SDN application 220 includes a variety of modules to perform functionality related to its function within the SDN environment, including development and promulgation of policies. In embodiments, the SDN application 220 includes a policy generation module 222 configured to generate a control policy for a network traffic event. The SDN application 220 can further include a policy conversion module 224 configured to convert the control policy to table configured for use by a SDN controller. The SDN application 220 can further include a controller communication module 226 configured to provide the table to the SDN controller. In such configurations, a control rule, which can be based on the table, is enforced by a network element in communication with the SDN controller 240 (e.g., as the network element is configurable using the SDN controller 240).

The SDN application 220 can, in various embodiments, include a variety of additional modules 228. These can include (but are not limited to) an authentication module, a monitor module, and an analysis module. The authentication module can be configured to authenticate the SDN application 220 to the SDN controller 240. The monitor module can be configured to monitor network traffic of the SDN application 220 and/or other network elements (e.g., other SDN applications, business applications, devices, network elements, nodes). The analysis module can be configured to identify patterns or types traffic within the network traffic, wherein the control policy is based on the patterns or types of traffic.

While the foregoing aspects are referred to as "modules," it is understood that various embodiments may implement such functionality according to a variety of mechanisms. For example, such aspects could be realized as components, subcomponents, engines, algorithms, functions, software packages, scripts, executables, libraries, et cetera.

Various alternative and complementary embodiments can include other aspects. For example, a control policy can include an action to be taken in response to current network traffic matching a pattern in the table. In embodiments, the table includes at least one OpenFlow Table Type Pattern (TTP). In embodiments, the network traffic event is a traffic signature over Stream Control Transmission Protocol (SCTP).

FIG. 2B depicts an illustration of a system 250 for the SDN environment, as implemented over, e.g., network 210 using SDN controller 240. The SDN environment includes an application plane 260, a control plane 268, and a data (or infrastructure) plane 276. The SDN controller 240 interacts with components of the application plane 260 using northbound APIs 266 and components of the data plane 276 using southbound APIs 272. Each plane is supported by various computing resources: application plane 260 and a SDN application 264 (and/or other applications therein including other SDN applications or business applications) are supported by device(s) 262 and control plane 268 and SDN controller 240 are supported by device(s) 270. Data plane 276 can be supported by local or network resources. Further, various devices and nodes can interact on or with data plane 276. Such devices can include network elements 278, which can include hybrid routers and switches configured for the SDN environment. Further, such devices can include devices on or communicating using network 210 (and/or network 210', which can be the same network or domain/subdomain thereof, or a different network). Devices 282, 284, 286, 292, 294, 296, 298, et cetera can be various devices operating on or using, or are interconnected by, the data plane 276 such as HSSs, MMEs, SGWs, et cetera. In the example illustrated, an anomalous SCTP host 288 can exist on or communicate using network(s) 210 (or 210'). Anomalous SCTP host 288 can be malicious, erroneous, or otherwise associated with undesired or improper traffic.

In an example use of system 250, the SDN application 264 can authenticate itself to the SDN controller 240 and request access to monitor traffic. Once granted, based on traffic monitoring, the SDN application 264 generates a security policy identifying SCTP signatures associated with unknown or malicious traffic (such as that from a rogue or anomalous SCTP host 288). The SDN application 264 can convert the security policy to a table and transmit it to the SDN controller 240. The SDN controller 240 can in turn construct control rules interpretable by hybrid network equipment 278 and deploy those rules to hybrid network equipment 278. If the SCTP signature associated with rogue or malicious traffic is detected by any of hybrid network equipment 278, a notification can be provided to the SDN application 264, which may then in turn provide an alert or notification of action to, e.g., a network or application administrator 290.

In sum, the embodiments of FIGS. 2A and 2B allow SDN applications to authenticate themselves to SDN controllers and request access to establish monitoring of traffic over networks. Such traffic can be mobile-carrier specific or relate to other parameters for what traffic is monitored. SDN applications can, based thereon, generate policies (e.g., security policies) which identify particular patterns or types of traffic (e.g., according to particular hosts, SCTP signatures, fingerprints, or other markers). These policies can be converted and/or provided to SDN controllers. The SDN controllers thereafter construct control rules (e.g., instructions for hybrid network equipment, which can include TTPs and MFTs) to dynamically monitor network traffic for transmissions matching or related to those described in the rules. When the hybrid network equipment detects transmissions matching or related to those of the rules, an action can be taken (e.g., alarm, change routing, et cetera). Reporting back to the SDN application can comprise a portion or all of the action.

Figure 3:
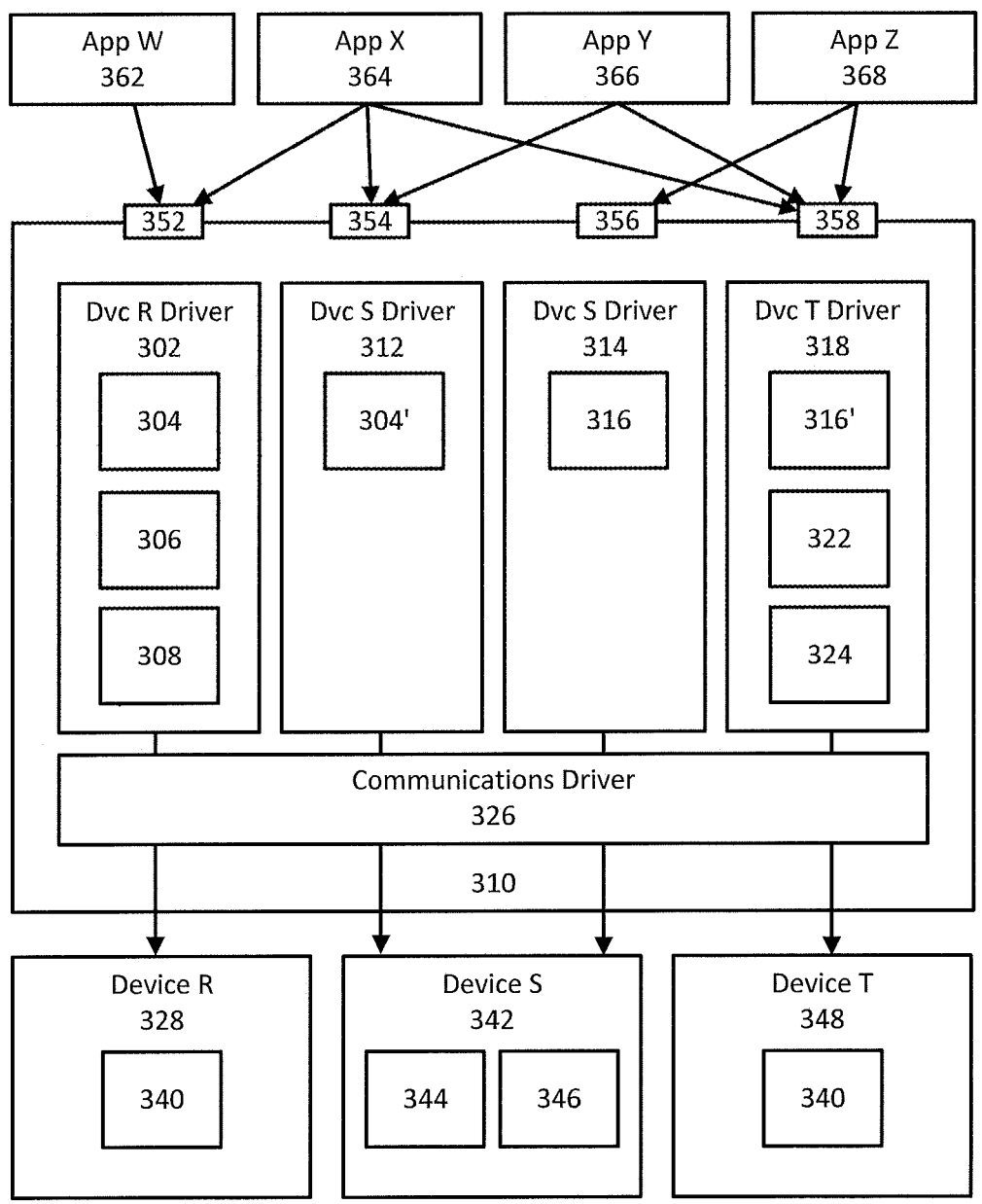
FIG. 3 illustrates an example system of the application configured to utilize VPN services.

FIG. 3 illustrates another example system 300 for implementing aspects of the invention. SDN applications W 362, X 364, Y 366, and Z 368 communicate with a SDN controller 310 via APIs 352, 354, 356, and 358. Each of the SDN applications W 362, X 364, Y 366, and Z 368 can identify traffic signatures or fingerprints, which may correspond to a device or originator (e.g., specific device, make, model, meeting certain parameters, et cetera) then transmit this information to the controller to assist with control and routing inside the respective application's application area.

To promulgate and enforce policies developed by the SDN applications W 362, X 364, Y 366, and/or Z 368, the SDN controller 310 includes a variety of device drivers, including a device R driver 302, a device S drivers 312 and/or 314, and a device T driver 318. The drivers can include various data. For example, the device R driver 302 can include a first application Table Type Pattern (TTP) library 304, as well as mappings for the first (306) and a second (308) application TTP libraries 304 and 316 to the device R driver 302. The first device S driver 312 can include the first application TTP library 304' (which may be the same or different than the first application TTP library 304 of the device R driver 302), and the second device S driver 314 can include the second TTP library 316. The device T driver 318 can include the second application TTP library 316' (which may be the same or different than the second application TTP library 316 of the second device S driver 314), as well as mappings for the first (324) and second (322) TTP libraries 304 and 316 to the device T driver 318.

The drivers and/or mappings facilitate mapping tables received via APIs 352, 354, 356, and 358 to device-specific instances according to the protocols used by the SDN controller 310 and associated devices (e.g., devices R 328, S 342, and T 348).

The SDN controller 310 further includes a communications driver 326. In embodiments, the communications driver 326 can be an OpenFlow driver. Mappings to device-specific instances for monitoring or enforcing a particular table or rule can, in embodiments, be realized according to the OpenFlow standard.

The SDN controller 310 communicates with a device R 328, a device S 342, and a device T 348. The device R 328 includes (or is communicatively coupled with) a device R TTP agent 340 for the first application TTP library 304, the device S includes (or is communicatively coupled with) a device S TTP agent 344 for the first application TTP library 304' and device S TTP agent 346 for the second application TTP library 316, and the device T includes (or is communicatively coupled with) a device T TTP agent 340 for the second application TTP library 316'. The respective agents can implement control rules received from the SDN controller 310 (e.g., deploy, monitor) and/or perform certain behaviors or actions in response to packets matching the control rules (e.g., a fingerprint or signature). Behaviors or actions can include (but are not limited to) blocking traffic, sending traffic elsewhere, collecting traffic for analysis, generating an alarm, et cetera.

While FIGS. 2A, 2B, and 3 illustrate various combinations and numbers of aspects therein, it is understood the particular illustrated is intended to convey one example, and various other numbers or combinations of, e.g., devices, SDN applications, network elements, APIs, et cetera, can be utilized without departing from the scope or spirit of the innovation. Further, FIGS. 2A, 2B, and 3 can include further elements such as input-output modules for presenting information in graphical user interfaces and in further embodiments receiving input via such graphical user interfaces. Policies, tables, rules, et cetera, as well as network topology, connections, relationships, et cetera, can be provided in formats suitable for display in graphical user interfaces, to provide information and/or opportunities for users to edit such information.

Figure 4:
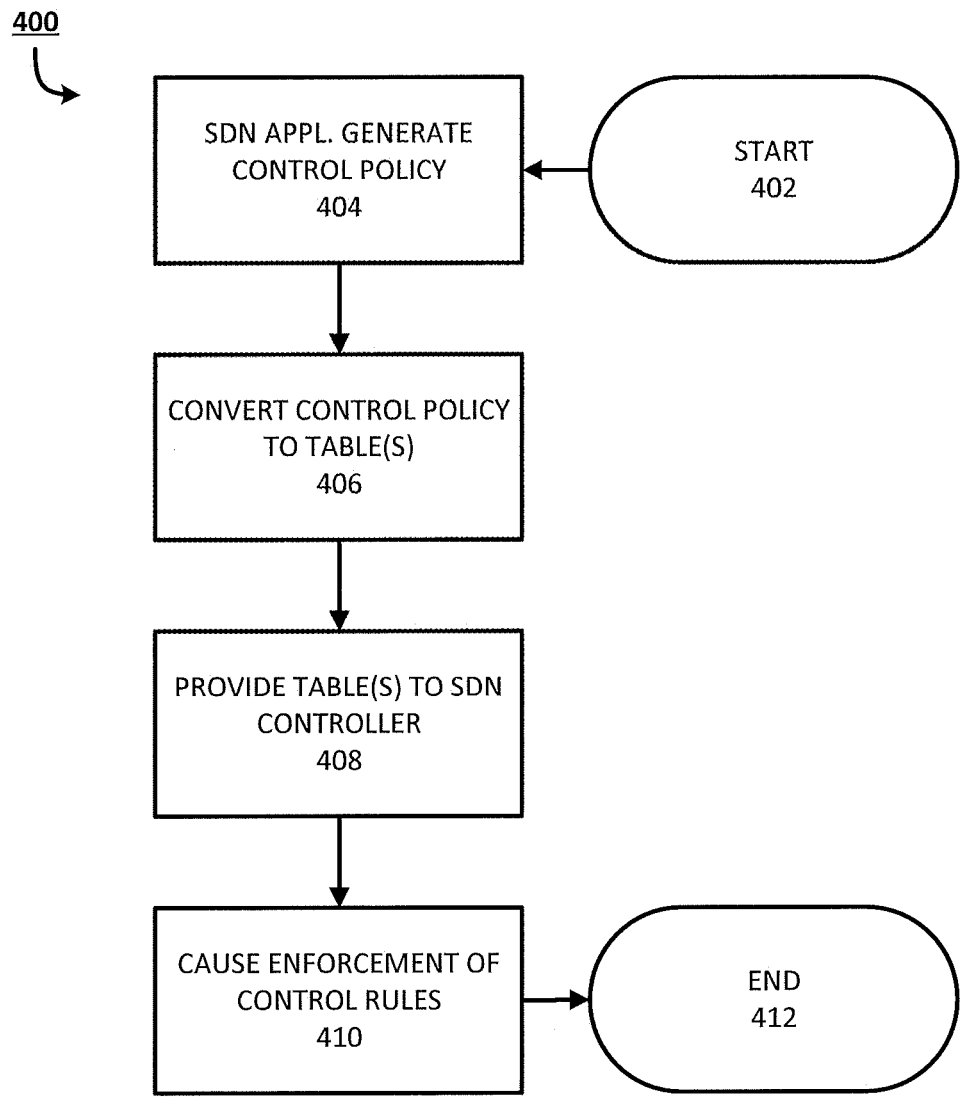
FIG. 4 illustrates an example embodiment of a methodology according to the application.
Figure 5:
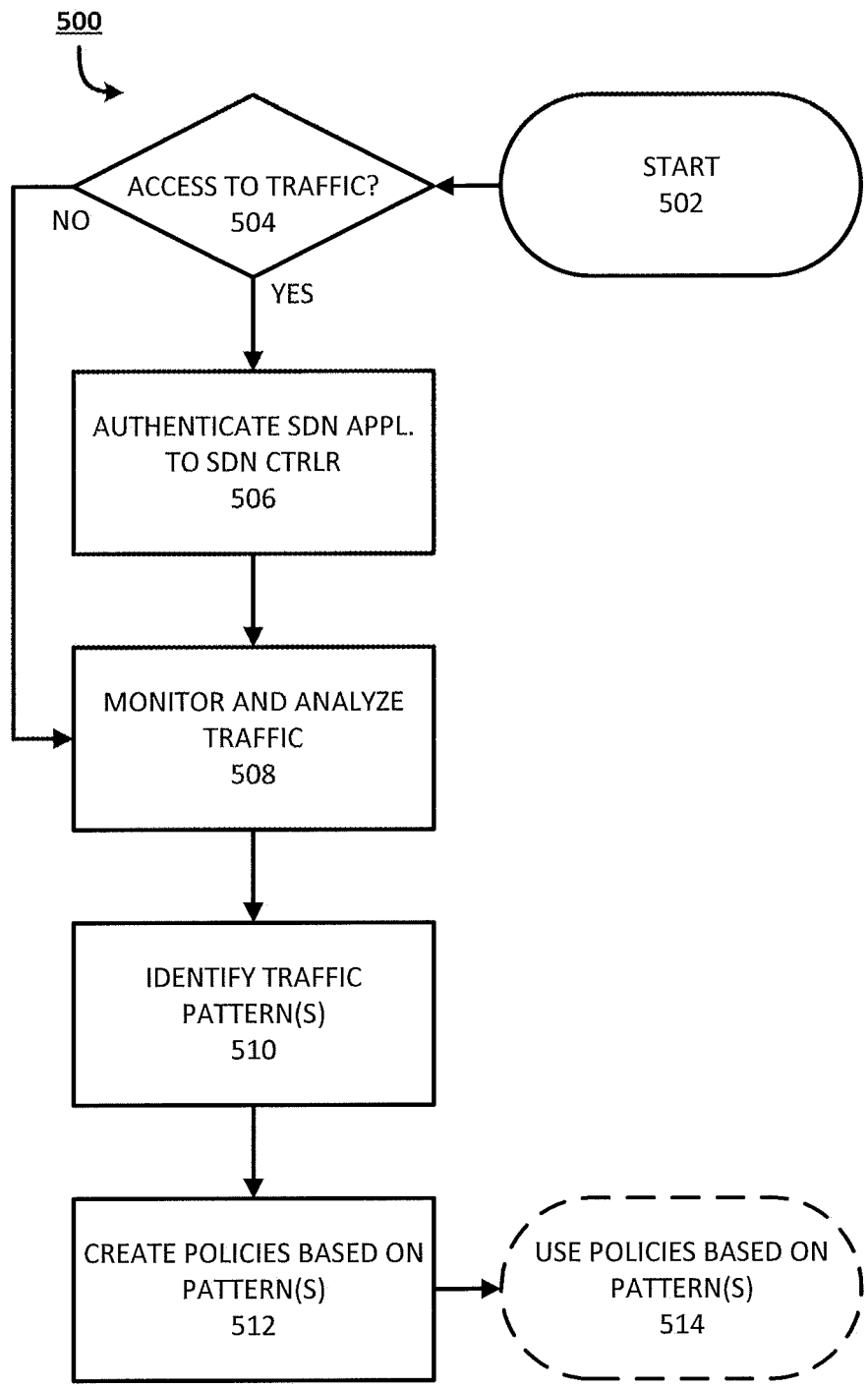
FIG. 5 illustrates an example embodiment of an alternative methodology according to the application.

FIGS. 4-6 illustrate various computer-implemented methodologies which can be effectuated in systems or environments as discussed above.

FIG. 4 illustrates an example methodology 400 for enforcing control rules developed by a SDN application. Methodology 400 begins at 402 and proceeds to 404 where a SDN application generates a control policy. The control policy can be based on traffic observed or analyzed and relate to traffic patterns or types which can reflect anomalous traffic to be handled in a particular manner. For example, malicious, unauthorized, or erroneous traffic can be handled according to certain rules. In other examples, excess traffic, even if proper can be handled according to certain rules. In still other examples, traffic identified as critical or prioritized can be handled according to further rules.

A "control policy" can be, in embodiments, a rule, policy, procedure, et cetera, which is interpretable or generated by one or more SDN applications. Control policies may be interpretable or generatable by other elements within a network (different SDN applications, network elements, network controllers, et cetera) but such need not be the case. In embodiments such as that of methodology 400, conversion or modification is needed to permit interpretation of control policies by a SDN controller and/or various network elements (including at least SDN or hybrid network elements). For example, the SDN application may identify a traffic pattern involving bursts of traffic having certain characteristics and/or transmitting from similar nodes as malicious. Identification of such patterns, in embodiments, can be an automated process using SDN application rules or machine learning. Alternatively or complementarily, identification of patterns can be, in some instances, a manual process by an administrator or user of the SDN application.

In the embodiment of methodology 400 and as discussed above, to allow a SDN controller to utilize the control policy developed by the SDN application, the SDN application can provide the control policy to an API associated with the SDN controller in a format usable by the API and/or SDN controller. Therefore, at 406, the SDN application can convert its policy into tables usable by the SDN controller. In an alternative embodiment, the SDN application can be configured to generate its control policy in a compatible table format, obviating the need for conversion before transmission to a SDN controller or other entity. In embodiments, the tables can be TTPs or multi-flow tables (MFTs). The tables are provided to the SDN controller at 408.

The SDN controller can be configured to generate a control rule based on the table. The control rule can be a rule interpretable by one or more network elements for implementing the effects of the control policy created by the SDN application. In embodiments alternative to that illustrated, the SDN application, the SDN controller, and one or more network elements may share a common format, obviating the need for conversion (and allowing either the control policy or the table to be provided directly to a network element by an element with permission to modify the network element such as the SDN controller).

With or without generation of a control rule from the table and/or control policy, the SDN controller may be configured to provide the control rule to a network element for enforcement by the network element. In embodiments, the SDN controller can maintain continuous authentication to the network element. In alternative embodiments, the SDN controller may re-authenticate or otherwise perform a security check prior to acceptance of a control rule by a network element.

At 410, the control rules can be enforced. This can involve implementing the policies using the SDN controller or deploying the policies to various network elements (e.g., routers, switches, et cetera) using the SDN controller. In this manner, network traffic can be handled according to a policy (e.g., security policy, other policy) developed by a SDN application.

Control rules, or the tables or policies on which they are based, can be security policies or other policies dictating how certain types of traffic are to be handled (as determined by the SDN application). In embodiments, the control rules (or other information exchanged) can conform to OpenFlow standards. In embodiments, one or more portions of information exchanged between the SDN application, the SDN controller, and/or one or more elements of network equipment can require transformation, conversion, generation, et cetera to ensure interpretability and/or conformance with standards (e.g., OpenFlow).

Policy enforcement can include identification of traffic matching a rule or one or more entries in a table and, in embodiments, taking action in response thereto. In embodiments, a pattern may not be anomalous in the sense of unauthorized or malicious packets, but allowable traffic volumes (of a particular type, from a particular origin, or in general) may be exceeded. In embodiments, a traffic signature or fingerprint over Stream Control Transmission Protocol (SCTP) can be recognized. Signatures or fingerprints can be associated with devices or particular software functions over a network. Actions can include, but are not limited to, generating or providing an alarm or alert, changing a path of network traffic, or changing resources associated with traffic.

FIG. 5 illustrates an example methodology 500 for developing policies for handling traffic using a SDN application. Methodology 500 begins at 502 and proceeds to 504 where a determination is made as to whether the SDN application can access information relating to traffic on which a policy will be based. If the SDN application can access information on which policies will be based (which can include traffic handled by the SDN application or traffic handled by other applications, network elements, et cetera), methodology 500 can proceed to 508. Otherwise, methodology 500 can proceed to authenticate the SDN application to the SDN controller at 506.

Authentication can involve a challenge, request for credentials, interrogation of the SDN application, lookup of information about the SDN application, et cetera. Authentication can be performed based on certain triggers, including but not limited to a request to access information about traffic from a SDN application in communication with a SDN controller.

Once the SDN application has appropriate authentication and/or permissions to at least read traffic on which policies will be based (which can include traffic already handled by or involving the SDN application or traffic of remote elements to which the SDN application must be directed or identified and authenticated), the traffic is analyzed to identify traffic patterns or traffic types at 510 for handling according to policies which can be thereafter developed or implemented by the SDN application.

Based on monitoring and analysis, policies can be generated or modified at 512 to determine manners for handling traffic matching particular patterns or types. Policies can include, but need not be limited to, security policies for handling anomalous traffic (including, e.g., erroneous traffic, unauthorized traffic, malicious traffic, et cetera). In alternative or complementary embodiments non-security policies can concern maintaining quality of service or other particular handling (e.g., providing routing to nodes that have more resources, are closer in the network, or are less congested).

After policies are defined at 512, they can be promulgated or implemented for enforcement at 514. This can include providing the policies from the SDN application to a SDN controller configured to enforce the policies or cause enforcement of the policies by providing or installing the policies to various network elements configurable by the SDN controller. In embodiments, an authentication step (or further authentication step) can be performed before the SDN controller (or other elements) receive or utilize policies developed by the SDN application. In embodiments, a policy testing step can be performed to validate or test the policy from SDN application prior to implementation.

Further Examples and Alternative Embodiments

Example systems or methods disclosed herein can be configured such that a SDN application generates a control policy for a network traffic event. The SDN application can provide the control policy to a SDN controller or other network elements (directly or by way of the SDN controller) to allow for policy enforcement. The policy as generated by the SDN application can be provided to a SDN controller and/or network elements in a native format, or can be converted to one or more alternative formats (TTP, MFT, et cetera) before sending.

Further example systems or methods disclosed herein can be configured such that a SDN controller receives a control policy from a SDN application. The SDN controller can enforce the policy and/or deploy the policy to network elements for enforcement. The policy can be received by the SDN controller from the SDN application in a native format or following conversion to one or more alternative formats (TTP, MFT, et cetera) before receipt. Alternatively, the SDN controller, and/or one or more APIs associated therewith, can provide for conversion or interpretation of policies received from SDN controllers.

Further examples of systems and methods disclosed herein can be configured such that a network element receives a control policy from a SDN controller. The network element can implement the policy for enforcement. The policy can be received from the SDN controller by the network element in a native format or following conversion to one or more alternative formats (TTP, MFT, et cetera) before receipt.

Thus, while aspects herein and the claims herewith focus on function of the SDN application, it is understood that SDN controllers and network equipment participating in the solution(s) described are within the embrace of this disclosure. Further, systems or methods which combine operation of two or more of a SDN application which generates policies, a SDN controller operable with said SDN application(s), and/or network elements operable with said SDN application(s) and/or SDN controller(s) are also specifically contemplated.

In alternative embodiments, two or more of a policy (generated by, e.g., a SDN application), table (generated by, e.g., a SDN application or a SDN controller), and/or control rule (generated by, e.g., a SDN controller or a network element) may be equivalent or interoperable. In this regard, a policy generated by a SDN application may be deployed to network elements using a controller without conversion or regeneration in alternative forms, or the number of conversions may be reduced (e.g., table deployable to network element without need to convert to control rule that is different from table).

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented method for network traffic control by a Software Defined Networking (SDN) application, comprising:
generating, using the SDN application, a control policy for a network traffic event, wherein the SDN application is a network element operable by way of a network application plane;
converting the control policy to a table configured for use by a SDN controller, wherein the SDN controller operable by way of a control plane; and
providing, from the SDN application, the table to the SDN controller,
authenticating the SDN application to the SDN controller, wherein authenticating the SDN application to the SDN controller provides the SDN application permissions to access network traffic information related to the SDN application and another node in communication with the SDN controller;
monitoring, using the SDN application, the network traffic information associated with network devices via a data plane; and
analyzing, using the SDN application, the network traffic information, wherein the control policy is based on analysis of the network traffic information,
wherein a control rule based on the table is enforced by a network element in communication with the SDN controller, wherein the network element is operable by way of the data plane.

2. The computer-implemented method of claim 1, further comprising:
analyzing, using the SDN application, network traffic related to the SDN application, wherein the control policy is based on analysis of the network traffic, and
wherein the control policy is configured to identify anomalous traffic based on the analysis of the network traffic.

3. The computer-implemented method of claim 1, wherein the control policy is configured to identify anomalous traffic based on the analysis of the network traffic information.

4. The computer-implemented method of claim 1, wherein the control policy includes an action to be taken in response to current network traffic matching the table.

5. The computer-implemented method of claim 1, wherein the network element includes a hybrid router, wherein the hybrid router is configured to communicate by conventional and OpenFlow protocols.

6. The computer-implemented method of claim 1, wherein the network traffic event is a traffic signature over Stream Control Transmission Protocol (SCTP).

7. The computer-implemented method of claim 1, wherein the table includes at least one OpenFlow Table Type Pattern (TTP).

8. The computer-implemented method of claim 1, wherein the table includes at least one OpenFlow Multi-Flow Table (MFT).

9. The computer-implemented method of claim 4, wherein the action includes one or more of providing an alarm, changing a path of the current network traffic, or changing resources associated with the current network traffic.

10. The computer-implemented method of claim 9, wherein the action includes removing a VPN connection based on the matching of a pattern defined in the table, wherein the pattern is associated with unauthorized traffic.

11. A computer-implemented system for network traffic control by a Software Defined Networking (SDN) application comprising:
a non-transitory memory having instructions stored thereon for implementing elements for network traffic control by the SDN application, wherein the SDN application is a network element operable by way of a network application plane; and
a processor operatively coupled to the non-transitory memory and configured to execute the instructions thereby effectuating:
a policy generation module of the SDN application configured to generate a control policy for a network traffic event;
a policy conversion module of the SDN application configured to convert the control policy to table configured for use by a SDN controller, wherein the SDN controller operable by way of a control plane; and
a controller communication module of the SDN application configured to provide a table to the SDN controller,
authenticating the SDN application to the SDN controller, wherein authenticating the SDN application to the SDN controller provides the SDN application permissions to access network traffic information related to the SDN application and another node in communication with the SDN controller;
monitoring, using the SDN application, the network traffic information associated with network devices via a data plane; and
analyzing, using the SDN application, the network traffic information, wherein the control policy is based on analysis of the network traffic information,
wherein a control rule based on the table is enforced by a network element in communication with the SDN controller, wherein the network element is operable by way of the data plane.

12. The computer-implemented system of claim 11, wherein the non-transitory memory stores instructions that when executed by the processor are configured to effectuate:
an analysis module of the SDN application configured to identify anomalous traffic within the network traffic, wherein the control policy is based on the anomalous traffic.

13. The computer-implemented system of claim 11, wherein the control policy includes an action to be taken in response to current network traffic matching a pattern in the table.

14. The computer-implemented system of claim 11, wherein the table includes at least one OpenFlow Table Type Pattern (TTP).

15. The computer-implemented system of claim 11, wherein the network traffic event is a traffic signature over Stream Control Transmission Protocol (SCTP).

16. A system, comprising:
a non-transitory memory having instructions stored thereon; and
a processor operatively coupled to the non-transitory memory, wherein execution of the instructions by the processor causes:
generating, using a Software Defined Networking (SDN) application, a control policy for a network traffic event, wherein the SDN application is a network element operable by way of a network application plane;
converting the control policy to a table configured for use by a SDN controller, wherein the SDN controller operable by way of a control plane; and
providing, from the SDN application, the table to the SDN controller,
authenticating the SDN application to the SDN controller, wherein authenticating the SDN application to the SDN controller provides the SDN application permissions to access network traffic information related to the SDN application and another node in communication with the SDN controller;
monitoring, using the SDN application, the network traffic information associated with network devices via a data plane; and
analyzing, using the SDN application, the network traffic information, wherein the control policy is based on analysis of the network traffic information,
wherein a control rule based on a table is enforced by a network element in communication with the SDN controller, wherein the network element is operable by way of the data plane.

\* \* \* \* \*